(No Model.)
L. KATZENSTEIN.
ROD PACKING.
No. 301,998. Patented July 15, 1884.
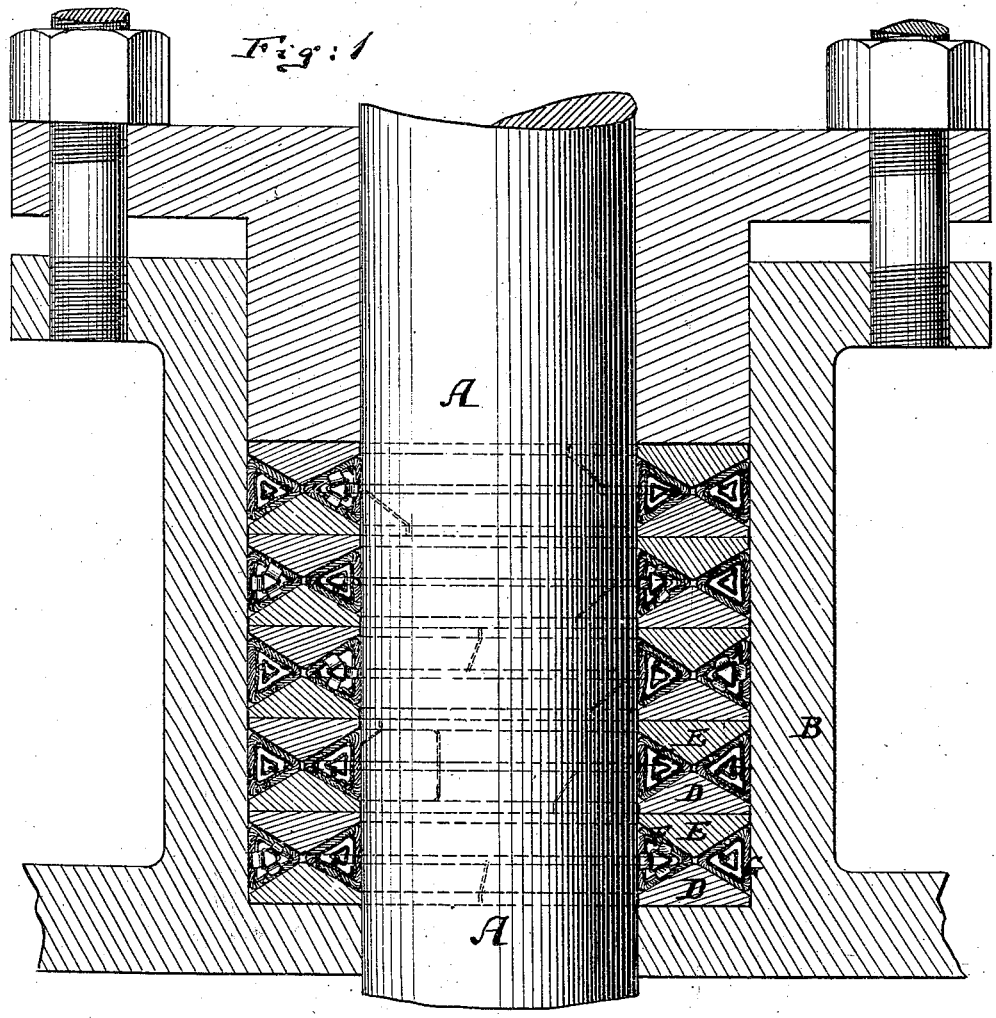

UNITED STATES PATENT OFFICE.

LEOPOLD KATZENSTEIN, OF NEW YORK, N. Y.

ROD-PACKING.

SPECIFICATION forming part of Letters Patent No. 301,998, dated July 15, 1884.

Application filed February 29, 1884. (No model.)

*To all whom it may concern:*

Be it known that I, LEOPOLD KATZENSTEIN, a resident of New York city, in the county and State of New York, have invented an Improved Rod-Packing, of which the following is a full, clear, and exact description, reference being made to the accompanying drawings, in which—

Figure 1 is a longitudinal section through a stuffing-box containing my improved packing. Figs. 2 and 3 are perspective views of parts of the packing.

This invention relates to a new, combined, metallic, and flexible packing for piston-rods, steam-pipes, and shafts; and it consists in alternating sectional rings made of soft metal with sectional rings made of tubing and wound with flexible matter, all as hereinafter more fully described.

In the drawings, the letter A represents the rod or other thing to be packed. B is a stuffing-box. The packing is shown in the stuffing-box and around said rod. It is composed of metallic sections D E, and of hollow tubular sections F G. Each section D is a ring of metal, with a ridge-shaped upper face, as is more clearly shown in Fig. 3. Each of these rings is composed of two parts, as is also shown in Fig. 3, thus rendering it laterally extensible. Each ring E is of the same construction, substantially, as the ring D, only inverted. In fact, in manufacturing the packing, the rings D and E, which are contiguous in the packing, as shown, need not be made in separate pieces. The ring F, which fills the triangular annular inner space between the rings D and E of each section, is constructed, as shown in Fig. 2, of an inner tubing, a, of brass or other metal, around which is wound soft wire b, and around this is wrapped another tubing or layer, e, of soft sheet metal, and around this again is placed a winding, f, of fibrous substance. The ends of the tube a are to be open. The outer ring, G, which is interposed between the rings D and E in the triangular annular outer space, is of the same construction as the tube F, only larger, to fill the space adapted for it. This packing, constructed of the parts named, will be self-adjusting in that any moisture in form of steam or liquid which may reach it will assist in producing a tight joint by causing the liquid which enters the tubes a to expand the rings F G, and by filling the cavities left unfilled by the rings D E F G. Under great strain the rings F and G will yield, being compressible and expansible, and at the same time the solid rings D E will serve to give stability to the whole packing, and likewise durability.

I claim—

1. The packing composed of alternate flexible rings and solid laterally-extensible sectional rings, substantially as described.

2. In a packing, the combination of the sectional solid rings D E with the hollow flexible rings F G, substantially as and for the purpose specified.

3. The packing composed of open-ended inner tube, a, coiled covering b, soft-metal tube e, and flexible covering f, substantially as herein shown and described.

4. A packing containing hollow flexible rings having open ends, substantially as herein shown and described.

LEOPOLD KATZENSTEIN.

Witnesses:
JOHN M. SPEER,
ABBIE S. KENDALL.